(12) United States Patent
Guillon et al.

(10) Patent No.: US 8,324,439 B2
(45) Date of Patent: *Dec. 4, 2012

(54) METHOD OF CONVERTING FEEDSTOCKS FROM RENEWABLE SOURCES TO GOOD-QUALITY DIESEL FUEL BASES USING A ZEOLITE TYPE CATALYST

(75) Inventors: Emmanuelle Guillon, Vernaison (FR); Christophe Bouchy, Lyons (FR); Nathalie Dupassieux, Lyons (FR); Antoine Daudin, Corbas (FR); Thierry Chapus, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 740 days.

This patent is subject to a terminal disclaimer.

(21) Appl. No.: 12/489,885

(22) Filed: Jun. 23, 2009

(65) Prior Publication Data

US 2009/0318740 A1    Dec. 24, 2009

(30) Foreign Application Priority Data

Jun. 24, 2008    (FR) .................................... 08 03530

(51) Int. Cl.
*C07C 1/00*    (2006.01)

(52) U.S. Cl. ........................... 585/240; 585/242; 44/605

(58) Field of Classification Search .................. 585/240, 585/242; 44/605, 308

See application file for complete search history.

(56) References Cited

U.S. PATENT DOCUMENTS

| | | | | |
|---|---|---|---|---|
| 4,992,605 A | * | 2/1991 | Craig et al. .................... | 585/240 |
| 5,705,722 A | * | 1/1998 | Monnier et al. .............. | 585/240 |
| 7,232,935 B2 | * | 6/2007 | Jakkula et al. ................. | 585/240 |
| 7,250,106 B2 | * | 7/2007 | Benazzi et al. .................. | 208/49 |
| 7,465,696 B2 | * | 12/2008 | Roby et al. ..................... | 508/485 |
| 7,491,858 B2 | * | 2/2009 | Murzin et al. ................. | 585/240 |
| 7,550,634 B2 | * | 6/2009 | Yao et al. ....................... | 585/240 |
| 7,626,063 B2 | * | 12/2009 | Ghonasgi et al. ............. | 585/276 |
| 7,691,159 B2 | * | 4/2010 | Li ................................... | 44/605 |
| 7,880,043 B2 | * | 2/2011 | Chapus et al. ................. | 585/240 |
| 2004/0230085 A1 | | 11/2004 | Jakkula et al. | |
| 2006/0186020 A1 | * | 8/2006 | Gomes ............................ | 208/46 |
| 2007/0006523 A1 | * | 1/2007 | Myllyoja et al. ................ | 44/308 |

FOREIGN PATENT DOCUMENTS

| | | |
|---|---|---|
| EP | 1 396 531 A2 | 3/2004 |
| EP | 1 741 768 A1 | 1/2007 |

OTHER PUBLICATIONS

International Search Report of FR 0803530 (Feb. 4, 2009).

\* cited by examiner

*Primary Examiner* — Nina Bhat
(74) *Attorney, Agent, or Firm* — Millen, White, Zelano & Branigan, P.C.

(57) ABSTRACT

A method of treating feedstocks from renewable sources in order to produce diesel fuel bases of excellent quality. The feedstocks used can be, for example, raw vegetable oils or such oils that have been previously subjected to a prerefining stage, animal fats, or mixtures of such feedstocks. The method includes fixed bed catalytic hydrotreatment, followed by fixed bed hydroisomerization with a catalyst based on monodimensional 10 MR zeolite and at least one metal from group VIII and/or VIB.

20 Claims, 1 Drawing Sheet

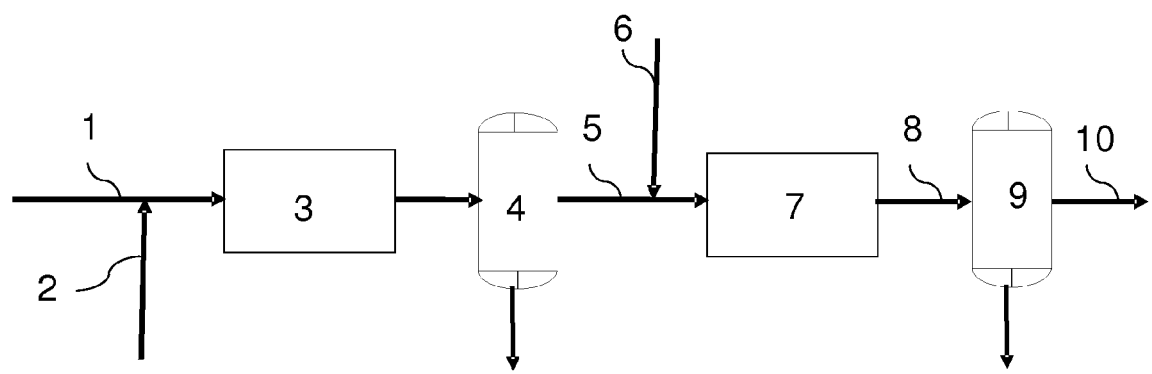

METHOD OF CONVERTING FEEDSTOCKS FROM RENEWABLE SOURCES TO GOOD-QUALITY DIESEL FUEL BASES USING A ZEOLITE TYPE CATALYST

CROSS-REFERENCE TO RELATED APPLICATION

This application is related to concurrently filed U.S. application Ser. No. 12/490,647 entitled "Method of Converting Feedstocks From Renewable Sources To Good-Quality Diesel Fuel Bases Using A Zeolite Catalyst Without Intermediate Gas-Liquid Separation", Emmanuelle Guillon et al., claiming priority of French application 08/03.531 filed Jun. 24, 2008, now French patent 2,932,812.

FIELD OF THE INVENTION

In an international context characterized by the fast growth of fuel needs, in particular diesel fuel bases in the European community, the search for new renewable energy sources that can be integrated in the conventional refining and fuel production scheme has become a major challenge.

Integration, in the refining process, of new products of vegetable origin, resulting from the conversion of lignocellulosic biomass or from the production of vegetable oils or animal fats, has therefore known renewed interest in the last few years because of the increase in the cost of fossil materials. Similarly, conventional biofuels (mainly ethanol or vegetable oil methyl esters) have acquired a real status as a complement to petroleum type fuels in gasoline pools. Besides, the processes known to date using vegetable oils or animal fats are the cause of $CO_2$ emissions known for their negative effects on the environment. A better use of these bioresources such as, for example, their integration in the gasoline pool, would therefore be an undoubted advantage.

The great demand for diesel fuels, combined with the high concern for the environment, reinforces the interest of using feedstocks coming from renewable sources. Examples of such feedstocks are vegetable oils, animal fats, raw or subjected to a preliminary treatment, as well as mixtures of such feedstocks. These feedstocks contain chemical structures of triglyceride or ester or fatty acid type, the hydrocarbon chain structure and length of the latter being compatible with the hydrocarbons present in diesel fuels.

A possible approach consists in converting the vegetable oil type feedstocks by transesterification. The triglycerides that essentially make up such feedstocks are then converted, in the presence of an alcohol and of a catalyst, to corresponding esters. The following drawbacks of this approach can be mentioned: a) the increase in NOx emissions, due to the presence of oxygen in the esters; b) the rather high boiling-point temperature, of the order of 360° C., which may pose problems for meeting the end point specifications.

BACKGROUND OF THE INVENTION

Patent application No .EP-1,681,337B1 A describes the conversion of feedstocks from renewable sources by decarboxylation in order to produce middle distillates. The advantage of this option consists in limiting the necessary hydrogen consumption. The method comprises an optional pretreatment stage followed by an isomerization stage using a catalyst containing a molecular sieve selected from among SAPO-11, SAPO-41, ZSM-22, ferrierite or ZSM-23 and a group VIII metal selected from among palladium, platinum and nickel, said method operating at a temperature ranging between 200° C. and 500° C., and at a pressure ranging between 2 and 15 MPa, the catalysts used being metallic catalysts. The diesel fuel base yields obtained with this method are however not maximized.

U.S. Pat. No. 4,992,605 describes a method of producing diesel fuel pool bases produced from the direct conversion of vegetable oils (rape, palm, soybean, sunflower) or lignocellulosic biomass to saturated hydrocarbons after hydrotreatment or hydrorefining of these products in the presence of a catalyst based on cobalt and molybdenum, at a temperature ranging between 350° C. and 450° C. and at a pressure ranging between about 4.8 MPa and 15.2 MPa. These conditions allow to obtain products with a high cetane number. The pro-cetane additives thus obtained are mixed with the diesel fuel in proportions ranging from 5 to 30% by volume. However, this method has the major drawback of involving a high hydrogen consumption due to the methanization or water-gas shift reactions. Besides, the oxygen contained in the triglycerides is generally decomposed by hydrodeoxygenation in the presence of a hydrotreating catalyst, which is costly in oxygen.

Patent application EP-1,741,768 describes a method comprising a hydrotreatment stage, followed by a hydroisomerization stage in order to improve the cold properties of the linear paraffins obtained. The catalysts used in the hydroisomerization stage are bifunctional catalysts consisting of a metallic active phase comprising a group VIII metal selected from among palladium, platinum and nickel, dispersed on a molecular sieve type acidic support selected from among SAPO-11, SAPO-41, ZSM-22, ferrierite or ZSM-23, said method operating at a temperature ranging between 200° C. and 500° C., and at a pressure ranging between 2 and 15 MPa. However, using this type of solid leads to a loss in the middle distillate yield for diesel fuel production.

One advantage of the invention is to provide a method allowing, from feedstocks coming from renewable sources, to obtain high diesel fuel base yields while allowing reduced hydrogen consumption.

OBJECT OF THE INVENTION

The present invention relates to a continuous method of converting feedstocks coming from renewable sources to diesel fuel bases.

The initial feedstocks come from renewable sources such as oils and fats of vegetable or animal origin, or mixtures of such feedstocks, containing triglycerides and/or fatty acids and/or esters. Possible vegetable oils, which can be raw or refined, totally or partly, can come from the following vegetables: rape, sunflower, soybean, palm, palm-nut, olive, coconut, jatropha, but this list is not limitative. Algae or fish oils are also pertinent. Examples of possible fats are all the animal fats such as lard or the fats consisting of food industry residues or from the catering industries.

The feedstocks thus defined contain triglyceride and/or fatty acid structures whose fatty chains contain a number of carbon atoms ranging between 8 and 25.

The hydrocarbons produced upon conversion of the initial feedstocks according to the invention are characterized by:

a) a number of carbon atoms equal to that of the initial fatty acid chains, if the mechanism is a mechanism of hydrogenation of the carboxyl group to an alkyl group, b) a hydrocarbon chain comprising one carbon atom less than the initial fatty acid chains, if the mechanism involved is decarboxylation/decarbonylation, c) an adjusted hydrocarbon branching degree so as to obtain cold strength properties and a cetane number compatible with the current standards for diesel fuel.

It is well known from the state of the art that conversion options a) and b) generally co-exist. The method described in the present invention consequently aims to maximize the diesel fuel yield and to promote the hydrogenation mechanism described in a). Selection of the catalysts and of the operating conditions thus tends to orient the selectivity in favour of hydrogenation, while trying to limit to the bare essentials the hydrogen consumption, in particular one that would result in the appearance of unwanted reactions. Besides, the method described in the present invention also aims to substantially isomerize the paraffins of the diesel fuel cut while limiting their cracking to unwanted lighter fractions such as, for example, the naphtha cut.

The diesel fuel bases produced are of excellent quality:
they have a low sulfur, nitrogen and aromatics content,
an excellent cetane number due to the substantially paraffinic structure of the hydrocarbons formed,
good cold strength properties due to the degree of isomerization of the paraffins of the cut,
a low density (generally less than 800 kg/m$^3$), which is an advantage insofar as the specification for the diesel fuel pool that is 845 kg/m$^3$ maximum is more easily obtained.

SUMMARY OF THE INVENTION

The invention relates to a method of treating a feedstock from a renewable source, comprising the following stages:

a) hydrotreatment in the presence of a fixed-bed catalyst, said catalyst comprising a hydro-dehydrogenizing function and an amorphous support, at a temperature ranging between 200° C. and 450° C., at a pressure ranging between 1 MPa and 10 MPa, at an hourly space velocity ranging between 0.1 h$^{-1}$ and 10 h$^{-1}$ and in the presence of a total amount of hydrogen mixed with the feedstock such that the hydrogen/feedstock ratio ranges between 150 and 750 Nm$^3$ hydrogen/m$^3$ feedstock, b) separation, from the effluent from stage a), of the hydrogen, the gases and at least one hydrocarbon-containing base, c) hydroisomerization of at least part of said hydrocarbon-containing base from stage b) in the presence of a fixed-bed hydroisomerization selective catalyst, said catalyst comprising at least one group VIII metal and/or at least one VIB group metal and at least one mono-dimensional 10 MR zeolite molecular sieve, said stage c) being carried out at a temperature ranging between 150° C. and 500° C., at a pressure ranging between 1 MPa and 10 MPa, at an hourly space velocity ranging between 0.1 h$^{-1}$ and 10 h$^{-1}$ and in the presence of a total amount of hydrogen mixed with the feedstock such that the hydrogen/feedstock ratio ranges between 70 and 1000 Nm$^3$/m$^3$ feedstock, d) separation, from the effluent from stage c), of the hydrogen, the gases and at least one diesel fuel base.

DETAILED DESCRIPTION

The present invention is particularly dedicated to the preparation of diesel fuel bases corresponding to the new environmental standards, from feedstocks coming from renewable sources.

These feedstocks consist of all of the vegetable oils and animal fats, essentially containing triglycerides and fatty acids or esters, with hydrocarbon fatty chains having a number of carbon atoms ranging between 6 and 25. These oils can be palm, palm-nut, copra, castor and cotton oil, peanut, linseed, crambe and jatropha oil, all the oils resulting for example from sunflower or rapeseed through genetic modification or hybridization, as well as algae oils. Waste kitchen oil, various animal oils such as fish oil, tallow, lard can also be used.

The densities at 15° C. of these oils range between 850 and 970 kg/m$^3$ and their kinematic viscosities at 40° C. range between 20 and 400 mm$^2$/s, more generally between 30 and 50 mm$^2$/s.

These feedstocks are free of or have low sulfur, nitrogen and aromatics contents: sulfur and nitrogen contents typically below 500 ppm and aromatics contents below 5% by weight.

Advantageously, the feedstock can be subjected, prior to stage a) of the method according to the invention, to a pretreatment or prerefining stage so as to remove, by means of a suitable treatment, contaminants such as metals, alkaline compounds for example on ion-exchange resins, alkaline-earth metals and phosphorus. Suitable treatments can for example be thermal and/or chemical treatments known to the person skilled in the art.

The optional pretreatment preferably consists in a mild prehydrogenation of said feedstock so as to avoid secondary reactions of the double bonds. Mild prehydrogenation is advantageously operated at a temperature ranging between 50° C. and 400° C., at a hydrogen pressure ranging between 0.1 and 10 MPa and preferably at a temperature ranging between 150° C. and 200° C. The prehydrogenation catalyst advantageously comprises group VIII and/or VIB metals and, preferably, the prehydrogenation catalyst is a catalyst based on palladium, platinum and nickel, nickel and molybdenum or based on cobalt and molybdenum, supported by an alumina and/or silica support.

The metals of the catalysts used in the optional pretreatment of the method according to the invention are sulfur-containing metals or metallic phases, preferably metallic phases.

Prerefined feedstocks are preferably used in the method according to the invention.

Stage a): Hydrotreatment of the Feedstock from a Renewable Source

In stage a) of the method according to the invention, the feedstock, possibly pretreated, is contacted with a heterogeneous catalyst at a temperature ranging between 200° C. and 450° C., preferably between 220° C. and 350° C., more preferably between 220° C. and 320° C. and most preferably between 220° C. and 310° C. The pressure ranges between 1 MPa and 10 MPa, preferably between 1 MPa and 6 MPa, and more preferably between 1 MPa and 4 MPa. The hourly space velocity ranges between 0.1 h$^{-1}$ and 10 h$^{-1}$. The feedstock is contacted with the catalyst in the presence of hydrogen. The total amount of hydrogen mixed with the feedstock is such that the hydrogen/feedstock ratio ranges between 150 and 750 Nm$^3$ hydrogen/m$^3$ feedstock, preferably between 150 and 700 Nm$^3$ hydrogen/m$^3$ feedstock, more preferably between 150 and 650 Nm$^3$ hydrogen/m$^3$ feedstock and most preferably between 150 and 600, which thus corresponds to an amount of hydrogen added to the feedstock present of at least generally 0.5% by weight of hydrogen in relation to the feedstock.

In stage a) of the method according to the invention, at least one fixed hydrotreatment catalyst bed comprising a hydro-dehydrogenizing function and a support is used. A catalyst whose support is for example selected from the group made up of alumina, silica, silica-aluminas, magnesia, clays and mixtures of at least two of these minerals is preferably used. This support can also contain other compounds and, for example, oxides selected from the group made up of boron oxide, zirconia, titanium oxide, phosphoric anhydride. A support consisting of alumina, more preferably of η, δ or γ alumina is preferably used.

Said hydrogenizing function of the catalyst used in stage a) of the method according to the invention is advantageously provided by at least one group VIII and/or group VIB metal.

Said catalyst can advantageously be a catalyst comprising group VIII metals such as, for example, nickel and/or cobalt, most often associated with at least one group VIB metal, for example molybdenum and/or tungsten. It is for example possible to use a catalyst comprising 0.5 to 10% by weight of nickel oxide (NiO), preferably 1 to 5% by weight of nickel oxide, and 1 to 30% by weight of molybdenum oxide ($MoO_3$), preferably 5 to 25% by weight of molybdenum oxide on an amorphous mineral support, the percentages being expressed in % by weight in relation to the total mass of catalyst.

The total proportion of oxides of group VIB and VIII metals in the catalyst used in stage a) advantageously ranges between 5 and 40% by weight and preferably between 6 and 30% by weight in relation to the total mass of catalyst.

The weight ratio expressed in metallic oxide between group VIB metal(s) and group VIII metal(s) advantageously ranges between 20 and 1, preferably between 10 and 2.

Said catalyst used in stage a) of the method according to the invention has to be advantageously characterized by a high hydrogenizing power so as to orient as much as possible the reaction selectivity towards a hydrogenation keeping the number of carbon atoms of the fatty chains, in order to maximize the yield in hydrocarbons falling within the distillation range of diesel fuels. This is the reason why a relatively low temperature is preferably used. Maximizing the hydrogenizing function also allows to limit the polymerization and/or condensation reactions leading to the formation of coke that would degrade the catalytic performance stability. A Ni or NiMo type catalyst is preferably used.

Said catalyst used in hydrotreatment stage a) of the method according to the invention can also advantageously contain an element such as phosphorus and/or boron. This element can be introduced into the matrix or preferably deposited on the support. It is also possible to deposit silicon on the support, alone or with phosphorus and/or boron and/or fluorine.

The proportion by weight of oxide in said element is usually advantageously less than 20%, preferably less than 10% and it is usually advantageously at least 0.001%.

The metals of the catalysts used in hydrotreatment stage a) of the method according to the invention are sulfur-containing metals or metallic phases.

A preferred metallic catalyst used in hydrotreatment stage a) of the method according to the invention comprises a nickel content ranging between 20% and 80% by weight, preferably between 55% and 65% by weight. The support of said catalyst is advantageously selected from the group made up of alumina, magnesium oxide and silica, and the support preferably consists of alumina.

A single catalyst or several different catalysts could be used simultaneously or successively in stage a) of the method according to the invention without departing from the scope of the present invention. This stage can be carried out industrially in one or more reactors with one or more catalyst beds and preferably with a descending liquid flow.

The reaction exothermy during hydrotreatment is limited by any method known to the person skilled in the art: liquid product recycle, quenching by the recycle hydrogen, etc.

Stage b): Separation of the Hydrotreated Effluent from Stage a)

In stage b) of the method according to the invention, the hydrotreated effluent is subjected at least partly, preferably totally, to one or more separations. The purpose of this stage is to separate the gases from the liquid, and notably to recover the hydrogen-rich gases that can also contain gases such as CO and $CO_2$, and at least one liquid hydrocarbon-containing base with a sulfur content below 10 ppm weight. The water possibly formed during stage a) is separated at least partly from the hydrocarbon-containing product. Separation stage b) can thus be followed by a water removal stage.

The purpose of the optional water removal stage is to eliminate at least partly the water produced during the hydrotreatment reactions. What is referred to as water removal is the elimination of the water produced by the hydrodeoxygenation reactions (HDO). More or less complete water removal can depend on the water tolerance of the hydroisomerization catalyst used in the subsequent stage of the method according to the invention. Water removal can be achieved by any means and techniques known to the person skilled in the art, for example drying, passage through a desiccant, flash, decanting, etc.

Stage c): Hydroisomerization of the Hydrotreated Effluent from Stage b)

At least part and preferably all of the liquid hydrocarbon-containing base obtained at the end of stage b) is hydroisomerized in the presence of a selective hydroisomerization catalyst. The hydroisomerization catalysts used in stage c) of the method according to the invention are advantageously of bifunctional type, i.e. they have a hydro/dehydrogenizing function and a hydroisomerizing function.

In accordance with stage c) of the method according to the invention, the hydroisomerization catalyst comprises at least one group VIII metal and/or at least one group VIB metal as the hydrodehydrogenizing function and at least one molecular sieve as the hydroisomerizing function.

According to the invention, the hydroisomerization catalyst comprises either at least one noble metal of group VIII preferably selected from among platinum or palladium, active in their reduced form, or at least one metal of group VIB, preferably selected from among molybdenum or tungsten, in combination with at least one non-noble metal of group VIII, preferably selected from among nickel and cobalt, preferably used in their sulfur-containing form.

In cases where the hydroisomerization catalyst comprises at least one group VIII noble metal, the total noble metal content of the hydroisomerization catalyst used in stage c) of the method according to the invention advantageously ranges between 0.01 and 5% by weight in relation to the finished catalyst, preferably between 0.1 and 4% by weight and more preferably between 0.2 and 2% by weight.

In cases where the hydroisomerization catalyst comprises at least one group VIB metal in combination with at least one group VIII non-noble metal, the group VIB metal content of the hydroisomerization catalyst used in stage c) of the method according to the invention advantageously ranges, in oxide equivalent, between 5 and 40% by weight in relation to the finished catalyst, preferably between 10 and 35% by weight and more preferably between 15 and 30% by weight, and the group VIII metal content of said catalyst advantageously ranges, in oxide equivalent, between 0.5 and 10% by weight in relation to the finished catalyst, preferably between 1 and 8% by weight and more preferably between 1.5 and 6% by weight.

The metallic hydro/dehydrogenizing function can advantageously be introduced on said catalyst by any method known to the person skilled in the art, such as, for example, comixing, dry impregnation, exchange impregnation.

In accordance with hydroisomerization stage c) of the method according to the invention, the hydroisomerization catalyst comprises at least one mono-dimensional 10 MR zeolite molecular sieve as the hydroisomerizing function.

Zeolite molecular sieves are defined in the "Atlas of Zeolite Structure Types" classification, W. M. Meier, D. H. Olson and Ch. Baerlocher, 5$^{th}$ revised edition, 2001, Elsevier, which the present application also refers to. The zeolites are classified according to their pore or channel opening size.

Mono-dimensional 10 MR zeolite molecular sieves have pores or channels whose opening is defined by a ring with 10 oxygen atoms (10 MR opening). The channels of the zeolite molecular sieve having a 10 MR opening are advantageously non-interconnected mono-dimensional channels that directly open onto the outside of said zeolite. The mono-dimensional 10 MR zeolite molecular sieves present in said hydroisomerization catalyst advantageously comprise silicon and at least one element T selected from the group made up of aluminium, iron, gallium, phosphorus and boron, preferably aluminium. The Si/Al ratios of the zeolites described above are advantageously those obtained upon synthesis or after post-synthesis dealumination treatments known to the person skilled in the art such as, without this list being exhaustive, hydrothermal treatments followed or not by acid attacks, or direct acid attacks by mineral or organic acid solutions. They are preferably, practically totally, in acidic form, i.e. the atomic ratio of the monovalent compensation cation (sodium for example) to element T inserted in the crystal lattice of the solid is advantageously below 0.1, preferably below 0.05 and more preferably below 0.01. Thus, the zeolites that go into said selective hydroisomerization catalyst are advantageously calcined and exchanged by at least one treatment with a solution of at least one ammonium salt so as to obtain the ammonium form of the zeolites that, once calcined, lead to the acidic form of said zeolites.

Said mono-dimensional 10 MR zeolite molecular sieve of said hydroisomerization catalyst is advantageously selected from among the zeolite molecular sieves of TON structural type, such as NU-10, EUO, selected from among EU-1 and ZSM-50, taken alone or in admixture, or zeolite molecular sieves ZSM-48, ZBM-30, IZM-1, COK-7, EU-2 and EU-11, alone or in admixture.

In accordance with hydroisomerization stage c) of the method according to the invention, said mono-dimensional 10 MR zeolite molecular sieve is selected from among the zeolite molecular sieves ZSM-48, ZBM-30, IZM-1 and COK-7, alone or in admixture. Said mono-dimensional 10 MR zeolite molecular sieve is preferably selected from among the zeolite molecular sieves ZSM-48 and ZBM-30, alone or in admixture. More preferably, said mono-dimensional 10 MR zeolite molecular sieve is ZBM-30 and more preferably said mono-dimensional 10 MR zeolite molecular sieve is ZBM-30 synthesized with the triethylene tetramine organic structurant.

Zeolite ZBM-30 is described in patent EP-A-46,504, and zeolite COK-7 is described in patent applications EP-1,702,888 A1 or FR-2,882,744 B1.

Zeolite IZM-1 is described in patent application FR-A-2,911,866 B1.

TON structural type zeolites are described in the book "Atlas of Zeolite Structure Types", W. M. Meier, D. H. Olson and Ch. Baerlocher, 5$^{th}$ revised edition, 2001, Elsevier.

The TON structural zeolite is described in the aforementioned book "Atlas of Zeolite Structure Types" and the NU-10 zeolite in patents EP-65,400 and EP-77,624.

The proportion of mono-dimensional 10 MR zeolite molecular sieve advantageously ranges between 5 and 95% by weight, preferably between 10 and 90% by weight, more preferably between 15 and 85% by weight and most preferably between 20 and 80% by weight in relation to the finished catalyst.

Said hydroisomerization catalyst preferably also comprises a binder consisting of a porous mineral matrix. Said binder can advantageously be used during the stage of forming said hydroisomerization catalyst. Forming is preferably performed with a binder consisting of a matrix containing alumina, in any form known to the person skilled in the art, and more preferably with a matrix containing gamma alumina.

The hydroisomerization catalysts obtained are formed as grains of various shapes and dimensions. They are generally used in form of cylindrical or polylobed, bilobed, trilobed extrudates of straight or twisted shape, but they can also be manufactured and used in form of crushed powders, bars, rings, balls, wheels. Other techniques than extrusion, such as pelletizing or drageification, can be advantageously used.

In cases where the hydroisomerization catalyst contains at least one noble metal, the noble metal contained in said hydroisomerization catalyst has to be advantageously reduced. One preferred method for conducting metal reduction is treatment under hydrogen at a temperature ranging between 150° C. and 650° C. and at a total pressure ranging between 1 and 250 bars. For example, reduction consists in a 2-hour step at 150° C., then a temperature rise up to 450° C. at a rate of 1° C./min, then again a 2-hour step at 450° C.; throughout this reduction phase, the hydrogen flow rate is 1000 normal m$^3$ hydrogen/m$^3$ catalyst and the total pressure is maintained constant at 1 bar. Any ex-situ reduction method can advantageously be considered.

In accordance with stage c) of the method according to the invention, in the hydroisomerization zone, the feedstock is contacted, in the presence of hydrogen, with said hydroisomerization catalyst, at operating temperatures and pressures advantageously allowing non-converting hydroisomerization of the feedstock. This means that hydroisomerization is carried out with a conversion of the 150° C.+ fraction to a 150° C.– fraction below 20% by weight, preferably below 10% by weight and more preferably below 5% by weight.

Thus, hydroisomerization stage c) of the method according to the invention operates at a temperature ranging between 150° C. and 500° C., preferably between 150° C. and 450° C. and more preferably between 200° C. and 450° C., at a pressure ranging between 1 MPa and 10 MPa, preferably between 2 MPa and 10 MPa and more preferably between 1 MPa and 9 MPa, at an hourly space velocity advantageously ranging between 0.1 h$^{-1}$ and 10 h$^{-1}$, preferably between 0.2 h$^{-1}$ and 7 h$^{-1}$ and more preferably between 0.5 h$^{-1}$ and 5 h$^{-1}$, at a hydrogen flow rate such that the hydrogen/hydrocarbon volume ratio advantageously ranges between 70 and 1000 Nm$^3$/m$^3$ feedstock, preferably between 100 and 1000 Nm$^3$ hydrogen/m$^3$ feedstock and more preferably between 150 and 1000 Nm$^3$ hydrogen/m$^3$ feedstock.

The possible hydroisomerization stage is preferably operated with a cocurrent flow.

Stage d): Separation, from the Effluent from Stage c), of the Hydrogen, the Gases and at Least One Diesel Fuel Base In accordance with the method according to the invention, in stage d) of the method according to the invention, the hydroisomerized effluent is subjected at least partly, preferably totally, to one or more separations. The purpose of this stage is to separate the gases from the liquid and notably to recover the hydrogen-rich gases that can also contain lights such as the $C_1$-$C_4$ cut and at least one diesel fuel cut and a naphtha cut. Upgrading of the naphtha cut is not the object of the present invention, but this cut can be advantageously sent to a steam cracking or catalytic reforming plant.

Gas Treatment and Recycle

The gas containing the hydrogen that has been separated in stages b) and d) is, if necessary, at least partly treated in order to reduce its proportion of lights ($C_1$ to $C_4$).

It is possible to add to the recycle gas of stage b) and/or of stage d) a certain amount of sulfur compound (such as DMDS, dimethyl disulfide) that produces hydrogen sulfide $H_2S$ through thermal decomposition. This device allows to maintain, if necessary, the hydrotreatment catalyst and/or the hydroisomerization catalyst in the sulfurized state. Advantageously, the amount of sulfur compound introduced is such that the $H_2S$ content of the recycle gas is at least 15 ppm vol, preferably at least 0.1% vol, or even at least 0.2% vol.

The recycle hydrogen can be advantageously introduced with the inflowing feedstock in stage a) and/or in stage c) and/or in form of quench hydrogen between the hydrotreatment and/or hydroisomerization catalyst beds.

Products Obtained

The product provided by this method exhibits excellent characteristics and it therefore is a diesel fuel base of excellent quality:
- its sulfur content is below 10 ppm weight
- its total aromatics content is below 5% by weight, and its polyaromatics content below 2% by weight
- the cetane number is excellent, above 55
- the density is below 840 kg/m³ and in most cases below 820 kg/m³
- the kinematic viscosity at 40° C. ranges from 2 to 8 mm²/s
- its cold strength properties are compatible with the current standards, with a cold filter-plugging point below −15° C. and a cloud point below −5° C.

The invention also relates to a plant that can be used for implementing the method according to the invention.

As shown in FIG. 1, the feedstock from renewable sources is fed through line (1) into hydrotreatment zone (3) operating in the presence of hydrogen, the hydrogen being delivered through pipe (2). In hydrotreatment zone (3), the feedstock is contacted with a hydrotreatment catalyst described above. The hydrotreated effluent is then fed into a separation zone (4) so as to separate the gases from the liquids. The hydrogen-rich gases are recovered and discharged through line (5), and the liquid hydrocarbon fraction is recovered and sent to a subsequent hydroisomerization stage (7) using the zeolite type selective hydroisomerization catalyst, through line (5). According to FIG. 1, the liquid diesel fuel base fraction is fed, with a hydrogen stream through line (6), into hydroisomerization zone (7) containing the selective hydroisomerization catalyst described above. The effluent thus hydroisomerized is then sent via pipe (8) to separation zone (9) so as to separate the gases from at least one diesel fuel cut recovered through line (10) that can be upgraded in the diesel fuel pool.

EXAMPLE 1

Stage a): Hydrotreatment

In a reactor whose temperature is controlled so as to provide isothermal operation and equipped with a fixed bed laden with 190 ml hydrotreatment catalyst based on nickel and molybdenum, having a nickel oxide content equal to 3% by weight, a molybdenum oxide content equal to 16% by weight and a $P_2O_5$ content equal to 6%, the catalyst having been previously sulfurized, 170 g/h prerefined rape oil of density 920 kg/m³, containing no aromatics and having a sulfur content below 10 ppm weight, of cetane number 35, of cold filter-plugging point of +20° C. and whose composition is given hereafter is introduced:

| Fatty acid glycerides | Fatty chain nature | % by mass |
|---|---|---|
| Palmitic | C16:0 | 4 |
| Palmitoleic | C16:1 | <0.5 |
| Stearic | C18:0 | 2 |
| Oleic | C18:1 | 61 |
| Linoleic | C18:2 | 20 |
| Linolenic | C18:3 | 9 |
| Arachidic | C20:0 | <0.5 |
| Gadoleic | C20:1 | 1 |
| Behenic | C22:0 | <0.5 |
| Erucic | C22:1 | <1 |

700 Nm³ hydrogen/m³ feedstock are fed into the reactor maintained at a temperature of 300° C. and at a pressure of 5 MPa.

Stage b): Separation of the Effluent from Stage a)

All of the hydrotreated effluent from stage a) is separated so as to recover the hydrogen-rich gases and a liquid diesel fuel base.

Stage c): Hydroisomerization of the Hydrotreated Effluent from Stage b) Over a Catalyst According to the Invention 1) Preparation of the Hydroisomerization Catalyst C1

The hydroisomerization catalyst is a catalyst containing a noble metal and a ZBM-30 mono-dimensional 10 MR zeolite. This catalyst is obtained according to the operating method described hereafter. The ZBM-30 zeolite is synthesized according to the BASF patent EP-A-46,504 with the triethylene tetramine organic structurant. The crude synthesis ZBM-30 zeolite is subjected to calcination at 550° C. in a dry air stream for 12 hours. The H-ZBM-30 zeolite (acid form) thus obtained has a Si/Al ratio of 45. The zeolite is mixed with a SB3 type alumina gel provided by the Condéa-Sasol Company. The mixed paste is then extruded through a 1.4 mm-diameter die. The extrudates thus obtained are calcined at 500° C. for 2 hours in an air stream. The proportion by weight of H-ZBM-30 is 20% by weight. The support extrudates are thereafter subjected to a stage of dry impregnation by an aqueous solution of platinum salt $Pt(NH_3)_4^{2+}$, $2OH^-$, left to mature in a water maturator for 24 hours at ambient temperature, then calcined for two hours in a dry air stream in a traversed bed at 500° C. (temperature rise step 5° C./min). The proportion by weight of platinum in the finished catalyst after calcination is 0.48%.

2) Hydroisomerization of the Hydrotreated Effluent

The effluent is hydroisomerized in a waste hydrogen stream over catalyst C1 in a hydroisomerization reactor under the following operating conditions:
- hourly space velocity (volume of feedstock/volume of catalyst/hour)=1 h⁻¹
- total operating pressure: 50 bars
- hydrogen/feedstock ratio: 700 normal litres/litre.

The temperature is adjusted so as to have a conversion of the 150° C.+ fraction to a 150° C.− fraction below 5% by weight upon hydroisomerization. Before testing, the catalyst undergoes a reduction stage under the following operating conditions:
- hydrogen flow rate: 1600 normal litres per hour and per litre catalyst
- ambient temperature rise 120° C.: 10° C./min
- one-hour step at 120° C.
- temperature rise from 120° C. to 450° C. at 5° C./min two-hour step at 450° C.
pressure: 1 bar.

The hydroisomerized effluent is then characterized. The yields and the fuel properties are given in Table 1 hereafter.

TABLE 1

| Product characteristics | |
|---|---|
| 150° C.⁻ cut (wt. %) | 3 |
| 150° C.⁺ cut (Diesel, wt. %) | 97 |
| Product quality of the 150° C.⁺ cut | |
| Cetane number (ASTMD613) | 64 |
| Cold filter-plugging point (° C.) | −27 |
| Sulfur content (ppm weight) | 0 |

The method according to the invention thus allows to obtain diesel fuel bases of excellent quality corresponding to the current specifications.

COMPARATIVE EXAMPLE

A feedstock identical to the feed of Example 1 is used in a process comprising a hydrotreatment stage a) operating under the same operating conditions and with the same catalyst as in stage a) of Example 1, a stage of separation b) of the hydrotreated effluent from stage a) so as to recover the hydrogen-rich gases and a liquid diesel fuel base, then a hydroisomerization stage operating under the same operating conditions as stage c) of Example 1, but with a different hydroisomerization catalyst.

The hydroisomerization catalyst is a catalyst containing a noble metal and a ZSM-22 mono-dimensional 10 MR zeolite. This catalyst is obtained according to the operating method described hereafter. The ZSM-22 zeolite is synthesized according to the method described by Ernst. Et al. (Applied Catalysis, 1989, 48, 137): 72 grams silica sol (Ludox AS40, DuPont) are diluted in 124 ml water; another solution containing 3.54 grams $Al_2(SO_4)_3$, $18H_2O$, 7.75 grams KOH and 16.7 grams diaminohexane in 177 ml water is added to the first solution and stirred. The gel obtained is then placed in stainless steel autoclaves at 50° C. After two-day synthesis, the autoclaves are opened and the synthesized zeolite is washed with water and filtered. The Si/Al atomic ratio of the crystallized structure is 30. The solid is thereafter thermally treated in a nitrogen stream (10 ml $N_2$/minute/gram of solid) for 5 hours at 400° C., then for 16 hours at 550° C. in an oxygen stream (10 ml $O_2$/minute/gram of solid). In order to exchange the alkaline cations with the ammonium ions, the solid is then brought to reflux for 4 hours in an aqueous solution of ammonium chloride (100 ml solution/gram of solid; ammonium chloride concentration 0.5 M). The sample is finally washed with distilled water to remove the alkaline chloride (silver nitrate test negative), then it is dried for one night in a drier at 60° C. The zeolite is thereafter mixed with a SB3 type alumina gel provided by the Condéa-Sasol Company. The mixed paste is subsequently extruded through a 1.4 mm-diameter die. The extrudates thus obtained are calcined at 500° C. for 2 hours in an air stream. The proportion by weight of H-ZSM-22 is 14% by weight. The support extrudates are thereafter subjected to a stage of dry impregnation by an aqueous solution of platinum salt $Pt(NH_3)_4^{2+}$, $2OH^-$, left to mature in a water maturator for 24 hours at ambient temperature, then calcined for two hours in a dry air stream in a traversed bed at 500° C. (temperature rise step 5° C./min). The proportion by weight of platinum in the finished catalyst after calcination is 0.35%.

The catalyst reduction stage is the same as the stage carried out for hydroisomerization catalyst C1, as well as the operating conditions of the hydroisomerization test. The temperature is adjusted so as to have product qualities comparable to those obtained with catalyst C1.

The hydroisomerized effluent is subsequently characterized. The yields and the fuel properties are given in Table 2.

TABLE 2

| Product characteristics | |
|---|---|
| 150° C.⁻ cut (wt. %) | 9 |
| 150° C.⁺ cut (Diesel, wt. %) | 91 |
| Product quality of the 150° C. + cut | |
| Cetane number (ASTMD613) | 62 |
| Cold filter-plugging point (° C.) | −25 |
| Sulfur content (ppm wt) | 0 |

In relation to hydroisomerization catalyst C1, it can be seen that using the ZSM-22 based hydroisomerization catalyst leads to a more significant light products loss for comparable product qualities. Accordingly, another aspect of the invention is to provide an effluent from a hydrotreatment of a renewable animal or vegetable source and to subject the effluent to hydroisomerization with at least one hydroisomerization catalyst comprising at least one group VIII and/or group VI metal and at least one mono-dimensional 10 MR zeolite molecular sieve, selected from among the zeolite molecular sieves of TON structural type, including NU-10, EUO, selected from among EU-1 and ZSM-50, taken alone or in admixture, or zeolite molecular sieves ZSM-48, ZBM-30, IZM-1, COK-7, EU-2 and EU-11, alone or in admixture.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 08/03.530, filed Jun. 24, 2008, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of treating a feedstock from a renewable vegetable or animal source, comprising the following stages:
   a) subjecting the feedstock to hydrotreatment in the presence of a fixed-bed catalyst, said catalyst comprising a hydro-dehydrogenizing function and an amorphous support, at a temperature ranging between 200° C. and 450° C., at a pressure ranging between 1 MPa and 10 MPa, at an hourly space velocity ranging between 0.1 $h^{-1}$ and 10 $h^{-1}$ and in the presence of a total amount of hydrogen mixed with the feedstock such that the hydrogen/feedstock ratio ranges between 150 and 750 Nm³ hydrogen/m³ feedstock to produce an effluent, b) separation, from the effluent from stage a), of the hydrogen, other gases and at least one hydrocarbon-containing base, c) hydroisomerization of at least part of said hydrocarbon-containing base from stage b) in the presence of a fixed-bed hydroisomerization selective catalyst, said catalyst comprising at least one group VIII metal and/or at least one VIB group metal and at least one monodimensional 10 MR zeolite molecular sieve, said stage c) being carried out at a temperature ranging between 150° C. and 500° C., at a pressure ranging between 1 MPa and 10 MPa, at an hourly space velocity ranging between 0.1 $h^{-1}$ and 10 $h^{-1}$ and in the presence of a total amount of hydrogen mixed with the feedstock such that the hydrogen/feedstock ratio ranges between 70 and 1000 Nm³/m³ feedstock to produce an effluent, d) separation, from the effluent from stage c), of the hydrogen, other gases and at least one diesel fuel base.

2. A method as claimed in claim 1, wherein stage a) operates in the presence of a total amount of hydrogen mixed with the feedstock such that the hydrogen/feedstock ratio ranges between 150 and 700 Nm³ hydrogen/m³ feedstock.

3. A method as claimed in claim 2, wherein stage a) operates in the presence of a total amount of hydrogen mixed with the feedstock such that the hydrogen/feedstock ratio ranges between 150 and 650 Nm³ hydrogen/m³ feedstock.

4. A method as claimed in claim 2, wherein stage a) operates in the presence of a total amount of hydrogen mixed with the feedstock such that the hydrogen/feedstock ratio ranges between 150 and 600 Nm³ hydrogen/m³ feedstock.

5. A method as claimed in claim 1, wherein the total proportion of oxides of group VIB and VIII metals in the catalyst used in stage a) ranges between 5 and 40% by weight in relation to the total mass of catalyst.

6. A method as claimed in claim 1, wherein said monodimensional 10 MR zeolite molecular sieve of said fixed bed hydroisomerization catalyst is selected from among the zeolite molecular sieves of TON structural type, including NU-10, EUO, selected from among EU-1 and ZSM-50, taken alone or in admixture, or zeolite molecular sieves ZSM-48, ZBM-30, IZM-1, COK-7, EU-2 and EU-11, alone or in admixture.

7. A method as claimed in claim 6, wherein said monodimensional 10 MR zeolite molecular sieve is selected from among the zeolite molecular sieves ZSM-48, ZBM-30, IZM-1 and COK-7, alone or in admixture.

8. A method as claimed in claim 7, wherein said monodimensional 10 MR zeolite molecular sieve is selected from among the zeolite molecular sieves ZSM-48 and ZBM-30, alone or in admixture.

9. A method as claimed in claim 8, wherein said monodimensional 10 MR zeolite molecular sieve is ZBM-30.

10. A method as claimed in claim 9, wherein said monodimensional 10 MR zeolite molecular sieve is ZBM-30 synthesized with the triethylene tetramine organic structurant.

11. A method as claimed in claim 1, wherein said hydroisomerization catalyst comprises either at least one noble metal of group VIII or at least one metal of group VIB, in combination with at least one non-noble metal of group VIII.

12. A method as claimed in claim 1, wherein the fixed bed hydroisomerization catalyst in stage c) comprises a noble metal content ranging between 0.01 and 5% by weight in relation to the finished catalyst.

13. A method as claimed in claim 1, comprising the group VIB metal the fixed bed hydroisomerization catalyst in stage c) in a content which ranges, in oxide equivalent, between 5and 40% by weight in relation to the finished catalyst, and the group VIII metal content of said catalyst ranges, in oxide equivalent, between 0.5 and 10% by weight in relation to the finished catalyst.

14. A method as claimed in claim 1, wherein the feedstock comprises at least one vegetable oil or animal fat, essentially containing triglycerides and fatty acids or esters, with hydrocarbon fatty chains having a number of carbon atoms ranging between 6 and 25.

15. A method according to claim 1, wherein said feedstock comprises at least one of palm, palm-nut, copra, castor and cotton oil, peanut, linseed, crambe and jatropha oil, an oil resulting from sunflower or rapeseed through genetic modification or hybridization, algae oil, waste kitchen oil and animal oil.

16. A method comprising providing an effluent from a hydrotreatment of a renewable animal or vegetable source and subjecting the effluent to a hydroisomerization stage with at least one hydroisomerization catalyst comprising at least one group VIII and/or group VI metal and at least one monodimensional 10 MR zeolite molecular sieve, selected from among the zeolite molecular sieves of TON structural type, including NU-10, EUO, selected from among EU-1 and ZSM-50, taken alone or in admixture, or zeolite molecular sieve ZSM-48, ZBM-30, IZM-1, COK-7, EU-2 and EU-11, alone or in admixture.

17. A method according to claim 16, further comprising separating from the hydrotreatment effluent, hydrogen, other gases and at least one hydrocarbon-containing base, said separating being conducted prior to the hydroisomerization stage.

18. A method according to claim 17, further comprising separating resultant effluent to recover at least one diesel fuel base.

19. A method according to claim 16, wherein said feedstock comprises at least one of palm, palm-nut, copra, castor and cotton oil, peanut, linseed, crambe and jatropha oil, an oil resulting from sunflower or rapeseed through genetic modification or hybridization, algae oil, waste kitchen oil and animal oil.

20. A method according to claim 19, wherein said 10 MR zeolite molecular sieve is ZBM-30.

* * * * *

UNITED STATES PATENT AND TRADEMARK OFFICE
CERTIFICATE OF CORRECTION

PATENT NO. : 8,324,439 B2
APPLICATION NO. : 12/489885
DATED : December 4, 2012
INVENTOR(S) : Emmanuelle Guillon et al.

It is certified that error appears in the above-identified patent and that said Letters Patent is hereby corrected as shown below:

Column 12, line 65 reads: "MPa, at an hourly space velocity ranging between $0.1^{-1}$" should read -- MPA, at an hourly space velocity ranging between $0.1\ h^{-1}$ --.

Signed and Sealed this
Nineteenth Day of February, 2013

Teresa Stanek Rea
*Acting Director of the United States Patent and Trademark Office*